(12) United States Patent
Miura et al.

(10) Patent No.: US 6,570,572 B1
(45) Date of Patent: May 27, 2003

(54) LINE DELAY GENERATOR USING ONE-PORT RAM

(75) Inventors: Manabu Miura, Tokyo (JP); Makoto Hatakenaka, Tokyo (JP); Mikio Tada, Osaka (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/303,623

(22) Filed: May 3, 1999

(30) Foreign Application Priority Data

Nov. 30, 1998 (JP) ............................................ 10-340587

(51) Int. Cl.[7] .................................................. G09G 5/39
(52) U.S. Cl. ...................................... 345/531; 345/534
(58) Field of Search ................................ 345/534, 531, 345/535, 519, 501, 530, 545, 522, 629; 382/100

(56) References Cited

U.S. PATENT DOCUMENTS

| | | | | |
|---|---|---|---|---|
| 5,353,402 A | * | 10/1994 | Lau | 345/535 |
| 6,144,362 A | * | 11/2000 | Kawai | 345/629 |
| 6,370,258 B1 | * | 4/2002 | Uchida | 382/100 |

FOREIGN PATENT DOCUMENTS

JP        5-135161        6/1993

OTHER PUBLICATIONS

IEEE Computer Society proceedings international Conference on Computer Design VLSI in Computers and processors "Development of a high bandwidth merged logic/DRAM multimedia chip" by Luk et al, Conf Date Oct. 12–15, 1997, pp. 279–285.*

* cited by examiner

*Primary Examiner*—Kee M. Tung
(74) *Attorney, Agent, or Firm*—Burns, Doane, Swecker & Mathis, LLP

(57) ABSTRACT

A line delay generator including a packetizing circuit, one port RAM and a RAM controller. The RAM controller provides the one port RAM with a write command to write packet data generated by the packetizing circuit, and with a read command to read any one or more packet data currently stored in the one port RAM, and output them as line delay data. The line delay generator can solve a problem involved in a conventional line delay generator in that because m (positive integer) two-port FIFOs must be connected in cascade to generate m line delay data, the FIFO memory becomes bulky.

12 Claims, 10 Drawing Sheets

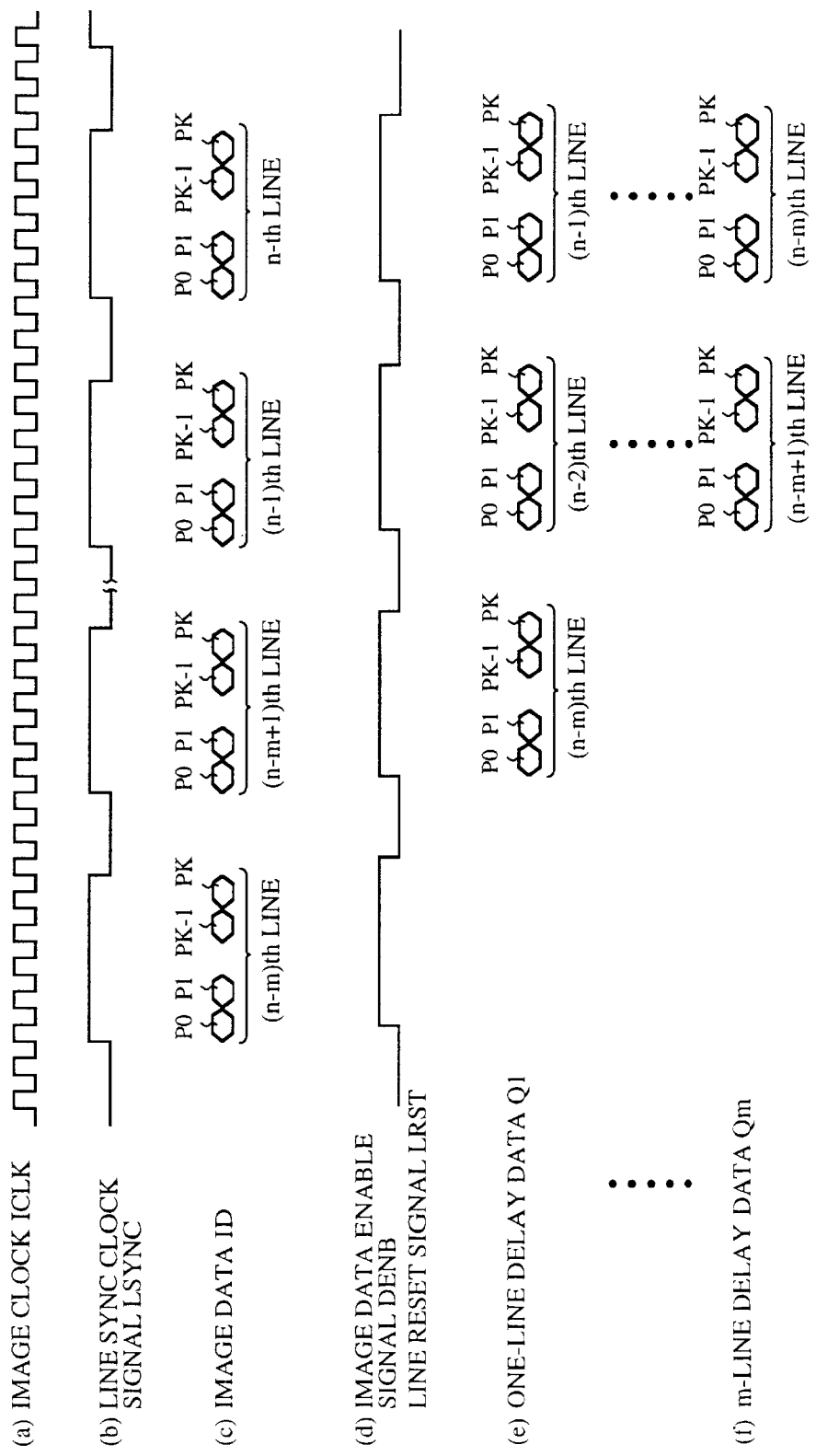

LINE DELAY GENERATOR USING ONE-PORT RAM

BACKGROUND OF THE INVENTION

1. Field of the Invention

The present invention relates to a line delay generator for delaying image data by temporarily storing it.

2. Description of Related Art

FIG. 9 is a block diagram showing a conventional line delay generator. In FIG. 9, the reference numeral 1 designates a controller that outputs an image data enable signal DENB by detecting the effective period of image data ID from a line synchronization signal LSYNC, and outputs a line reset signal LRST by detecting the ineffective period of the image data ID from the line synchronization signal LSYNC; and 2 designates a FIFO memory that loads the image data ID on a pixel by pixel basis in response to the image data enable signal DENB output from the controller 1, and outputs first to m-th line delay data Q1–Qm. The FIFO memory 2 consists of m two-port FIFOs connected in cascade.

Next, the operation of the conventional line delay generator will be described.

The line delay generator generates line delay data by temporarily storing the image data. The example as shown in FIG. 9 generates m line delay data with different delay times.

More specifically, the controller 1 monitors the signal level of the line synchronization signal LSYNC, and while the signal level is at the H (high) level, the controller 1 makes a decision that the current image data is effective, and supplies the FIFO memory 2 with the image data enable signal DENB.

In contrast, while the signal level of the line synchronization signal LSYNC is at the L (low) level, the controller 1 makes a decision that the current image data is ineffective, and supplies the FIFO memory 2 with the line reset signal LRST.

Then, as long as the controller 1 is outputting the image data enable signal DENB, the FIFO (1) of the FIFO memory 2 loads on a pixel by pixel basis the image data which is supplied in synchronization with an image clock signal ICLK, and simultaneously outputs the previously loaded image data as one-line delay data Q1.

Likewise, as long as the controller 1 is outputting the image data enable signal DENB, FIFO(2)–FIFO(m) of the FIFO memory 2 which are connected in cascade each load on a pixel by pixel basis the line delay data output from the previous FIFO, and output the previously loaded line delay data as two-line delay data Q2–m-line delay data Qm.

With the foregoing configuration, the conventional line delay generator can produce from the FIFO memory 2 the m line delay data Q1–Qm with different delay times. However, it has a drawback that the FIFO memory 2 becomes bulky because it consists of m two-port FIFOs connected in cascade to generate m line delay data.

On the other hand, Japanese patent application laid-open No. 5-135161/1993 discloses a technique that employs a single one-port DRAM instead of the FIFO memory consisting of m two-port FIFOs connected in cascade, thereby implementing a small line delay generator. However, it only discloses a technique that generates the line delay data by sequentially delaying the image data. It does not disclose a technique to output any of the delay line data during the write operation of one packet data, that is, to select any desired line delay data from among the one-line to m-line delay data stored in the one-port RAM. In addition, it does not disclose a technique to simultaneously output m line delay data with different delay times.

SUMMARY OF THE INVENTION

The present invention is implemented to solve the foregoing problem. It is therefore an object of the present invention to provide a line delay generator capable of reducing its packing area, and of producing any of the line delay data.

Another object of the present invention is to provide a line delay generator capable of simultaneously output a plurality of line delay data with different delay times.

According to a first aspect of the present invention, there is provided a line delay generator comprising: a packetizing circuit for packetizing image data to packet data; one port RAM for storing the packet data generated by the packetizing circuit; and a RAM controller for providing the one port RAM with a write command to write the packet data generated by the packetizing circuit, and with a read command to read any one or more packet data currently stored in the one port RAM.

Here, the RAM controller may provide the one port RAM with the read command to read the data currently stored in the one port RAM, and subsequently with the write command to write the packet data generated by the packetizing circuit.

The one port RAM may have a read/write bus with a width of 128 or more bits.

The packetizing circuit, the RAM controller and the one port RAM may be formed in one chip on a semiconductor substrate.

According to a second aspect of the present invention, there is provided a line delay generator comprising: a packetizing circuit for packetizing image data to packet data; one port RAM for storing the packet data generated by the packetizing circuit; a RAM controller for providing the one port RAM with a write command to write the packet data generated by the packetizing circuit, and with a read command to read packet data currently stored in the one port RAM; and an absorbing circuit for absorbing phase shift of the packet data read from the one port RAM.

Here, the RAM controller may provide the one port RAM with the read command to read the data currently stored in the one port RAM, and subsequently with the write command to write the packet data generated by the packetizing circuit.

The line delay generator may further comprise a processing circuit for processing the packet data whose phase shift is absorbed by the absorbing circuit, to generate processed image data.

The packetizing circuit may generate the packet data by packetizing the image data and the processed image data, and the absorbing circuit may split the packet data into the image data and the processed image data.

The line delay generator may further comprise a reprocessing circuit for reprocessing the processed image data split apart by the absorbing circuit.

The one port RAM may have a read/write bus with a width of 128 or more bits.

The packetizing circuit, the RAM controller, the one port RAM and the absorbing circuit may be formed in one chip on a semiconductor substrate.

The packetizing circuit, the RAM controller, the one port RAM, the absorbing circuit and the processing circuit may be formed in one chip on a semiconductor substrate.

BRIEF DESCRIPTION OF THE DRAWINGS

FIG. 10 is a timing chart illustrating timings of signals of the conventional line delay generator.

DETAILED DESCRIPTION OF THE PREFERRED EMBODIMENTS

The invention will now be described with reference to the accompanying drawings.

Embodiment 1

Figure 1:
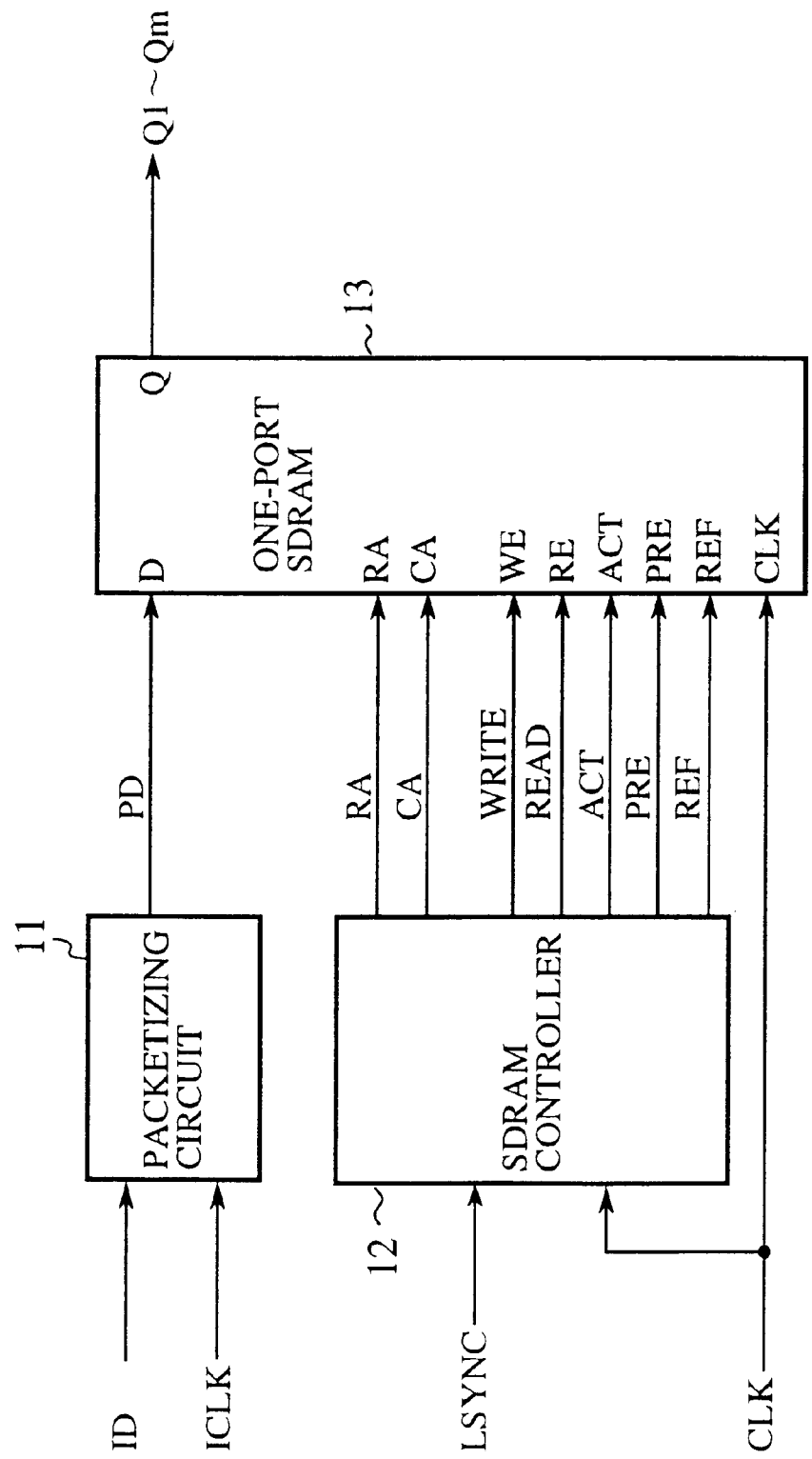
FIG. 1 is a block diagram showing an embodiment 1 of a line delay generator in accordance with the present invention.

FIG. 1 is a block diagram showing an embodiment 1 of a line delay generator in accordance with the present invention. In FIG. 1, the reference numeral 11 designates a packetizing circuit for generating packet data PD by packetizing image data ID input in synchronism with an image clock signal ICLK; 12 designates an SDRAM controller for providing a one-port SDRAM 13 with a write command to write the packet data assembled by the packetizing circuit 11, and with a read command to read desired packet data (line delay data) from among the packet data currently stored in the one-port SDRAM 13; and 13 designates the one-port SDRAM for temporarily storing the packet data PD, and for outputting line delay data (for example, first to m-th line delay data Q1–Qm).

Next, the operation of the present embodiment 1 will be described.

Figure 2:
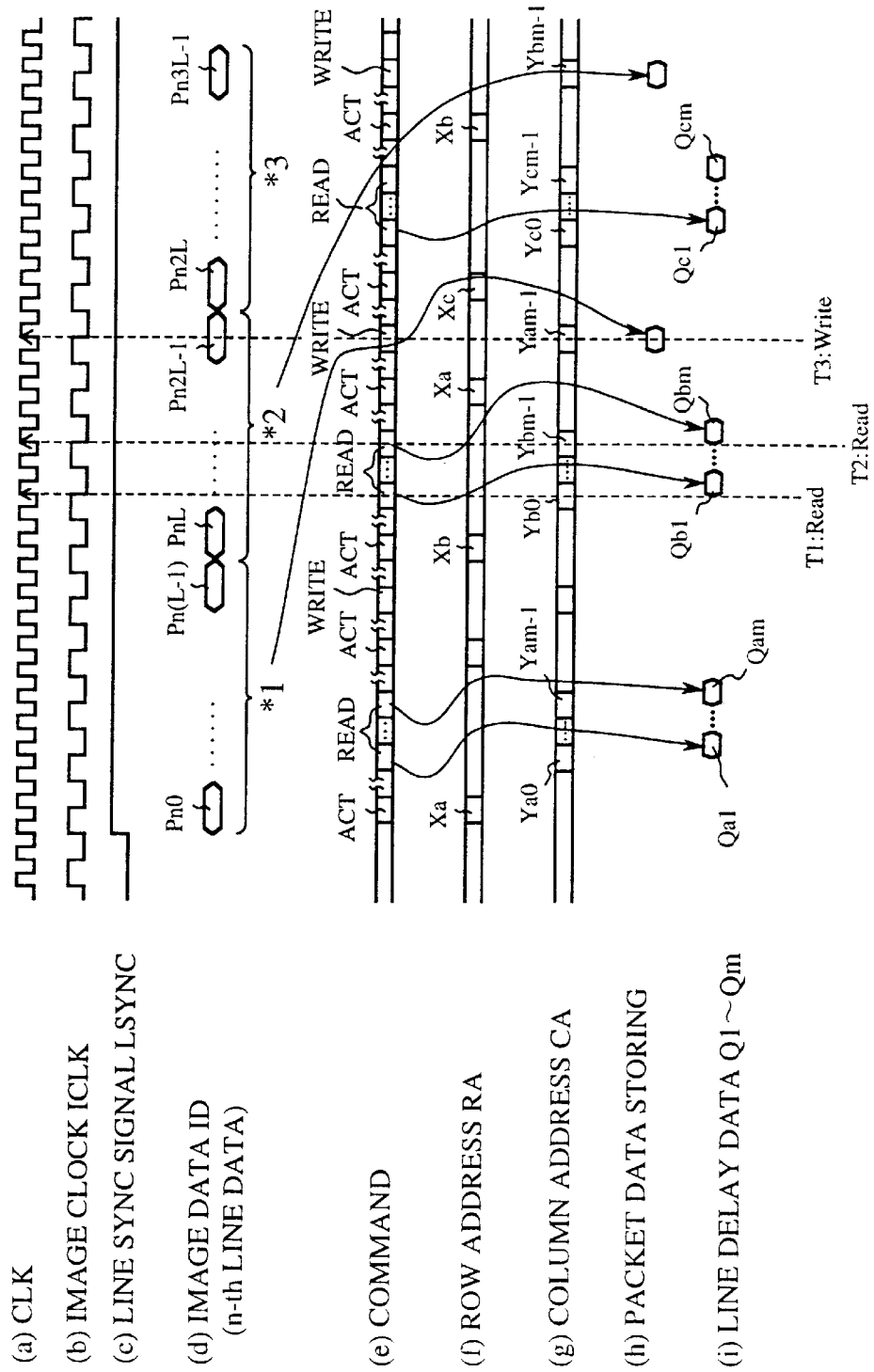
FIG. 2 is a timing chart illustrating timings of signals of the embodiment 1.

First, receiving the image data ID consisting of n-th line pixel data Pn0–Pn(L−1), PnL–Pn(2L−1), Pn2L–Pn(3L−1), . . . in synchronism with the image clock signal ICLK as illustrated in FIG. 2, the packetizing circuit 11 sequentially packetizes the pixel data Pn0–Pn(L−1), PnL–Pn(2L−1), Pn2L–Pn(3L−1), . . . to the packet data *1, *2, *3, . . . , and supplies them to the one-port SDRAM 13 to store them.

On the other hand, the SDRAM controller 12 monitors the signal level of a line synchronization signal LSYNC, and provides, while the signal level is at the H level, the one-port SDRAM 13 with the read command m times to read the packet data (first to m-th line delay data Qb1–Qbm with predetermined delay times) stored in the one-port SDRAM 13. Thus, the one-port SDRAM 13 outputs the one-line delay data Qb1, two-line delay data Qb2, . . . , and m-line delay data Qbm.

More specifically, to have the one-port SDRAM 13 output only the desired line delay data Qb1–Qbm (for example, only the line delay data associated with the left half image on a screen) from among the entire line delay data stored in the one-port SDRAM 13, the SDRAM controller 12 generates a row address signal Xb and column address signals Yb0–Ybm-1 indicative of the store addresses of the line delay data Qb1–Qbm, and outputs the read command "READ" m times during the time period T1–T2 (during which the pixel data PnL–Pn2L-1 are being input).

After the one-port SDRAM 13 outputs the line delay data Qb1–Qbm in this way, the SDRAM controller 12 has the one-port SDRAM 13 store the packet data packetized by the packetizing circuit 11, so as to delay the packet data. Specifically, the SDRAM controller 12 generates the row address signal Xa and column address signal Yam-1 indicating the address of the packet data, and supplies the one-port SDRAM 13 with a write command "WRITE" at time T3.

Thus, the present embodiment 1 is configured such that the SDRAM controller 12 supplies the one-port SDRAM 13 with the write command to write the packet data generated by the packetizing circuit 11, and with one or more read commands to read any desired packet data from among the packet data (line delay data) currently stored in the one-port SDRAM 13. This makes it possible for the line delay generator to output any of the line delay data without employing a plurality of two-port memory connected in cascade, thereby offering an advantage of being able to reduce the packing area.

Embodiment 2

Figure 3:
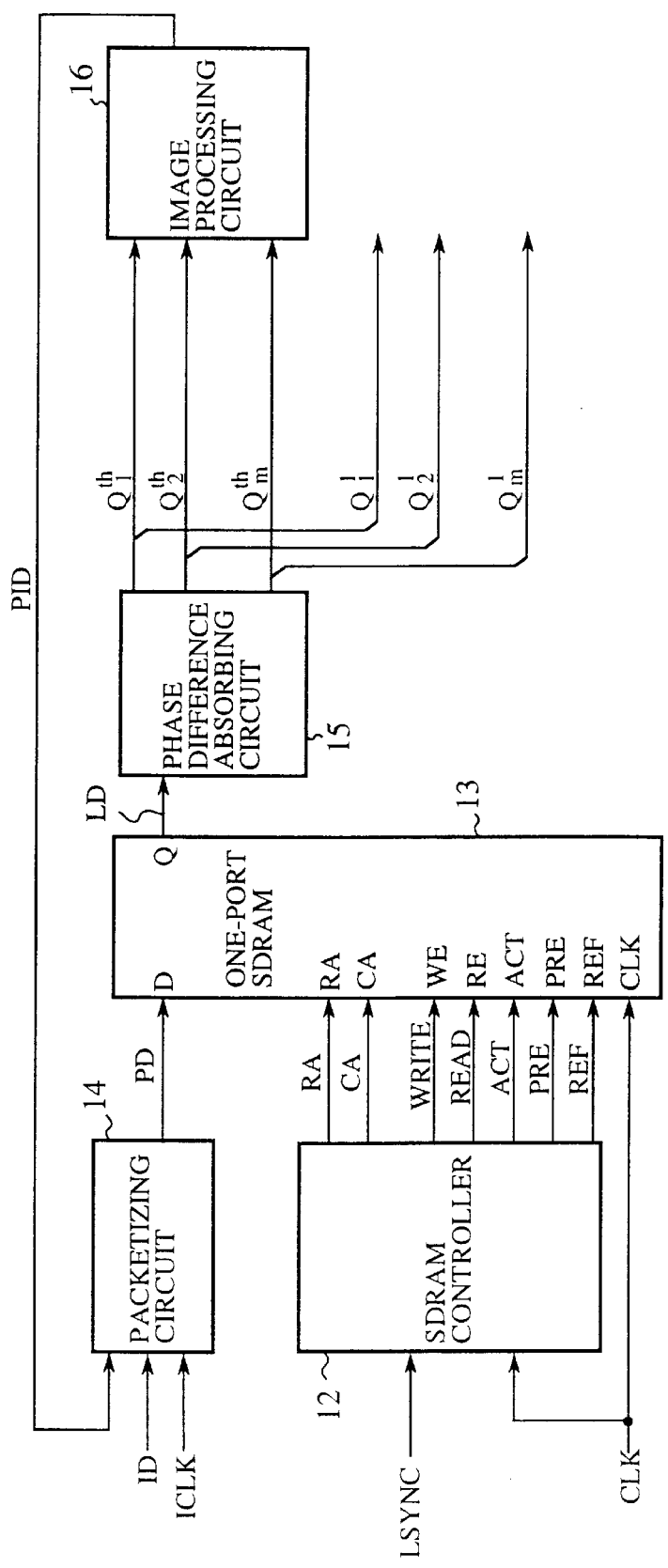
FIG. 3 is a block diagram showing an embodiment 2 of the line delay generator in accordance with the present invention.

FIG. 3 is a block diagram showing an embodiment 2 of the line delay generator in accordance with the present invention, in which the same reference numerals designate the same or like portions to those of FIG. 1, and the description thereof is omitted here.

In FIG. 3, the reference numeral 14 designates a packetizing circuit for assembling, when the image data ID is input in synchronism with the image clock signal ICLK, packet data PD by packetizing the image data ID and processed image data PID; 15 designates a phase difference absorbing circuit for absorbing phase differences of the line delay data supplied from the one-port SDRAM 13, and for splitting the line delay data into the image data ID and the processed image data PID; and 16 designates an image processing circuit for generating the processed image data PID by processing the image data extracted by the phase difference absorbing circuit 15.

Next, the operation of the present embodiment 2 will be described with reference to FIG. 4.

First, receiving the pixel data Pn0–Pn(L-1) in synchronism with the image clock signal ICLK as illustrated in FIG. 4(d), the packetizing circuit 14 packetizes the pixel data Pn0–Pn(L-1) and processed image data P1'0–P1'L-1 as shown in FIG. 4(l), and generates the packet data PD to store them in the one-port SDRAM 13.

On the other hand, the SDRAM controller 12 monitors the signal level of a line synchronization signal LSYNC as in the embodiment 1, and provides, while the signal level is at the H level, the one-port SDRAM 13 with a read command m times to read the packet data stored in the one-port SDRAM 13 in order to output them as the one-line to m-line delay data Qa1–Qam with predetermined delay times.

More specifically, to have the one-port SDRAM 13 output only the desired line delay data Qa1–Qam (for example, only the line delay data associated with the left half image on the screen) from among the entire line delay data stored in the one-port SDRAM 13, the SDRAM controller 12 generates a row address signal Xa and column address signals Ya0–Yam-1 indicative of the store addresses of the line delay data Qa1–Qam, and outputs the read command "READ" m times during the time period T1–T2 (during which the image data Pn0–Pn(L-1) are being input).

Incidentally, the one-line delay data Qa1 consists of the one-line delay data of the image data and the 0-(L- 1)-th pixel data of the one-line delay data of the processed image data; and the m-line delay data Qam consists of them-line delay data of the image data and 0-(L-1)-th pixel data of the m-line delay data of the processed image data.

After the one-port SDRAM 13 outputs the intended line delay data Qa1–Qam, the SDRAM controller 12 has the one-port SDRAM 13 store the packet data packetized by the packetizing circuit 14, so as to delay the packet data. Specifically, the SDRAM controller 12 generates the row address signal Xa and column address signal Yam-1 indicating the address of the packet data, and supplies the one-port SDRAM 13 with a write command "WRITE" at time T3.

Thus, the line delay data Qa1–Qam are sequentially output from the one-port SDRAM 13. It is sometimes necessary, however, for the line delay data Qa1–Qam to be output not sequentially but simultaneously. The phase difference absorbing circuit 15 absorbs the phase shift of the line delay data Qa1–Qam supplied from the one-port SDRAM 13 to output them at the same time. More specifically, receiving the line delay data Qa1–Qam sequentially from the one-port SDRAM 13, the phase difference absorbing circuit 15 temporarily stores them, and outputs them when all of them are received.

Furthermore, since the line delay data Qa1–Qam include the image data and the processed image data, the phase difference absorbing circuit 15 splits them, and supplies the line delay data associated with the image data to the image processing circuit 16, and the line delay data associated with the processed image data to the outside.

Receiving the plurality of line delay data associated with the image data simultaneously from the phase difference absorbing circuit 15, the image processing circuit 16 adds to them processing such as adjusting the color of the image, and supplies the processed image data PID to the packetizing circuit 14.

Here, the reason why the image processing circuit 16 supplies the processed image data PID to the packetizing circuit 14 will be described briefly. Generating the line delay data of the processed image data will be possible by providing a packetizing circuit, an SDRAM controller and a one-port SDRAM in the post-stage of the image processing circuit 16. This, however, will increase the number of components and the packing area.

In contrast, the line delay data of the processed image data can be generated without providing such circuits as the packetizing circuit and one-port SDRAM in the post-stage of the image processing circuit 16, by supplying the packetizing circuit 14 with the processed image data to be packetized simultaneously with the image data.

As described above, the present embodiment 2 is configured such that the phase difference absorbing circuit 15 absorbs the phase difference of the line delay data which are read from the one-port SDRAM 13. This offers an advantage of being able to output a plurality of line delay data with different delay times at the same time.

Embodiment 3

Although the packet data are written in one address and read from another address in the foregoing embodiments 1 and 2, they can be read from and written in the same address because the new packet data are written after reading the old packet data.

In this case, overwriting the packet data of the input image data on the address of the oldest line delay data makes it possible for the one-port SDRAM 13 to reduce its memory capacity to an amount corresponding to the number of lines needed for carrying out the image processing.

For example, if the image processing requires YM byte line delay data of XM byte image data corresponding to a sheet of paper, where Y<X, it is not necessary for the one-port SDRAM 13 to store the entire image data of XM bytes. The image processing of the entire XM byte image data can be achieved by storing only YM byte image data (line delay data).

Embodiment 4

Figure 4:
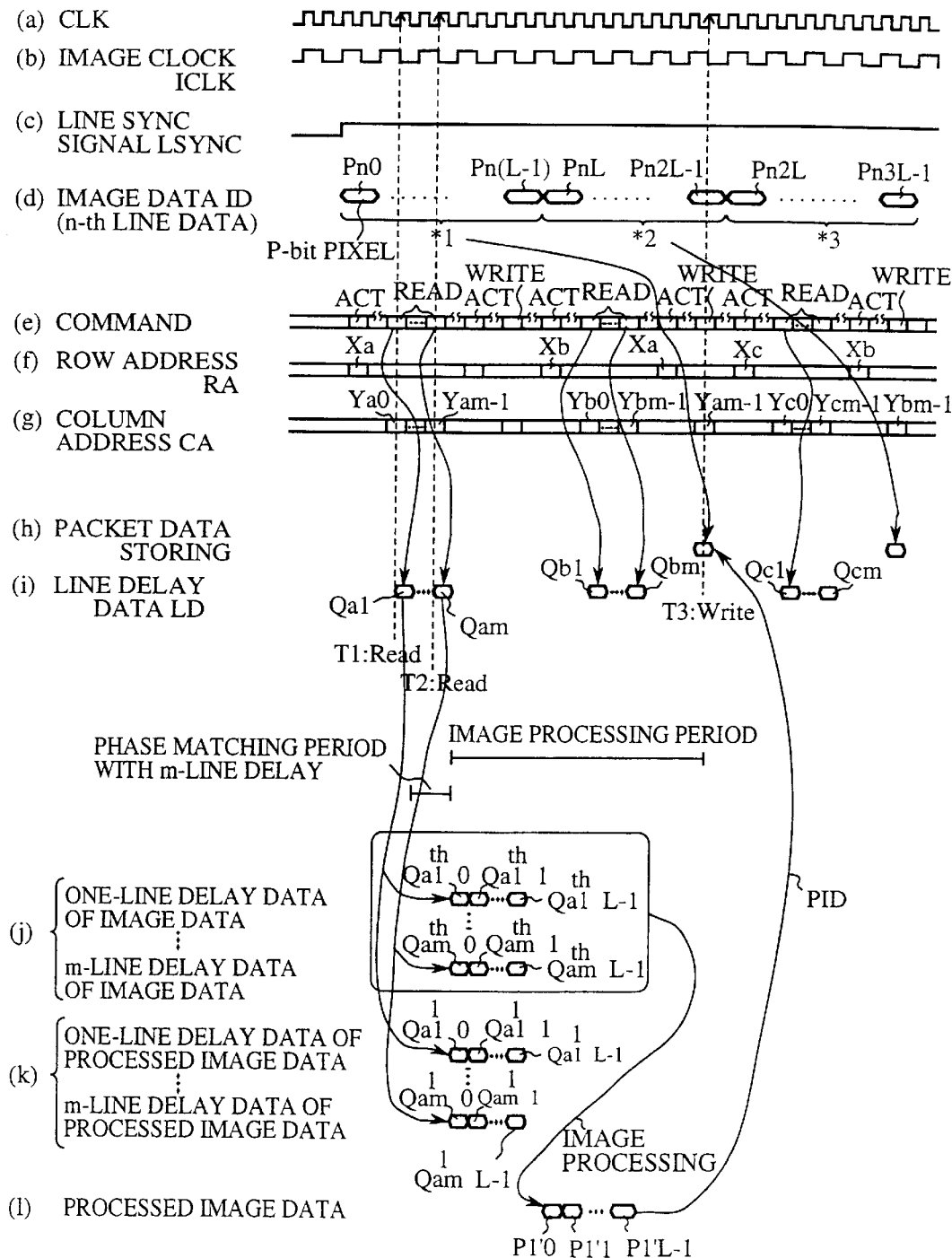
FIG. 4 is a timing chart illustrating timings of signals of the embodiment 2.
Figure 5:
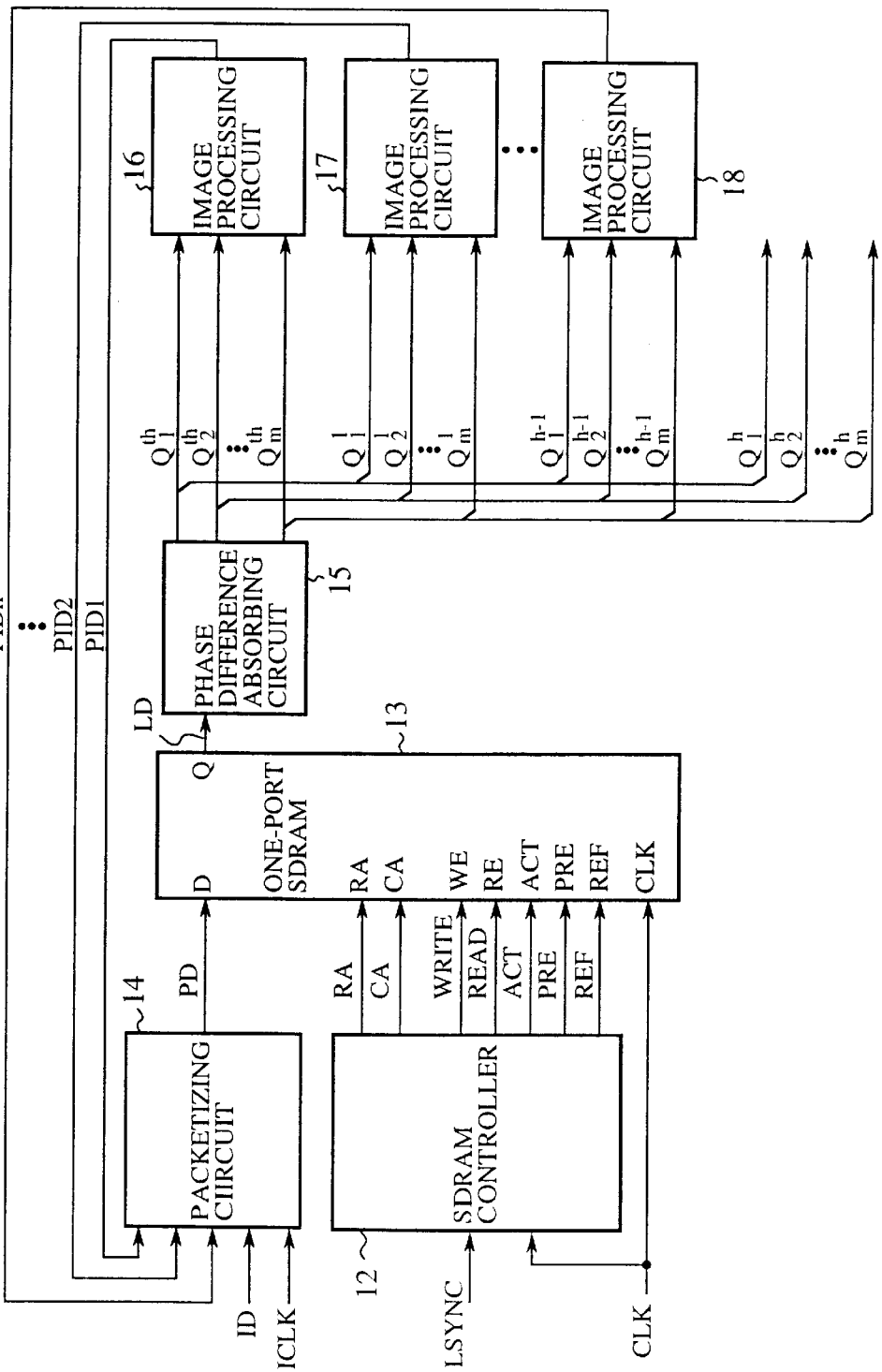
FIG. 5 is a block diagram showing an embodiment 4 of the line delay generator in accordance with the present invention.

Although the foregoing embodiment 2 outputs the line delay data of the processed image data as shown in FIG. 3 in connection with FIG. 4($k$), this is not essential. For example, as shown in FIG. 5, image processing circuits 17–18 can be provided to reprocess the line delay data of the processed image data split by the phase difference absorbing circuit 15. The image processing circuits 17–18 process the line delay data from the first to (h–1)-th processed image data, and the phase absorbing circuit 15 outputs the line delay data of the h-th processed image data.

Figure 6:
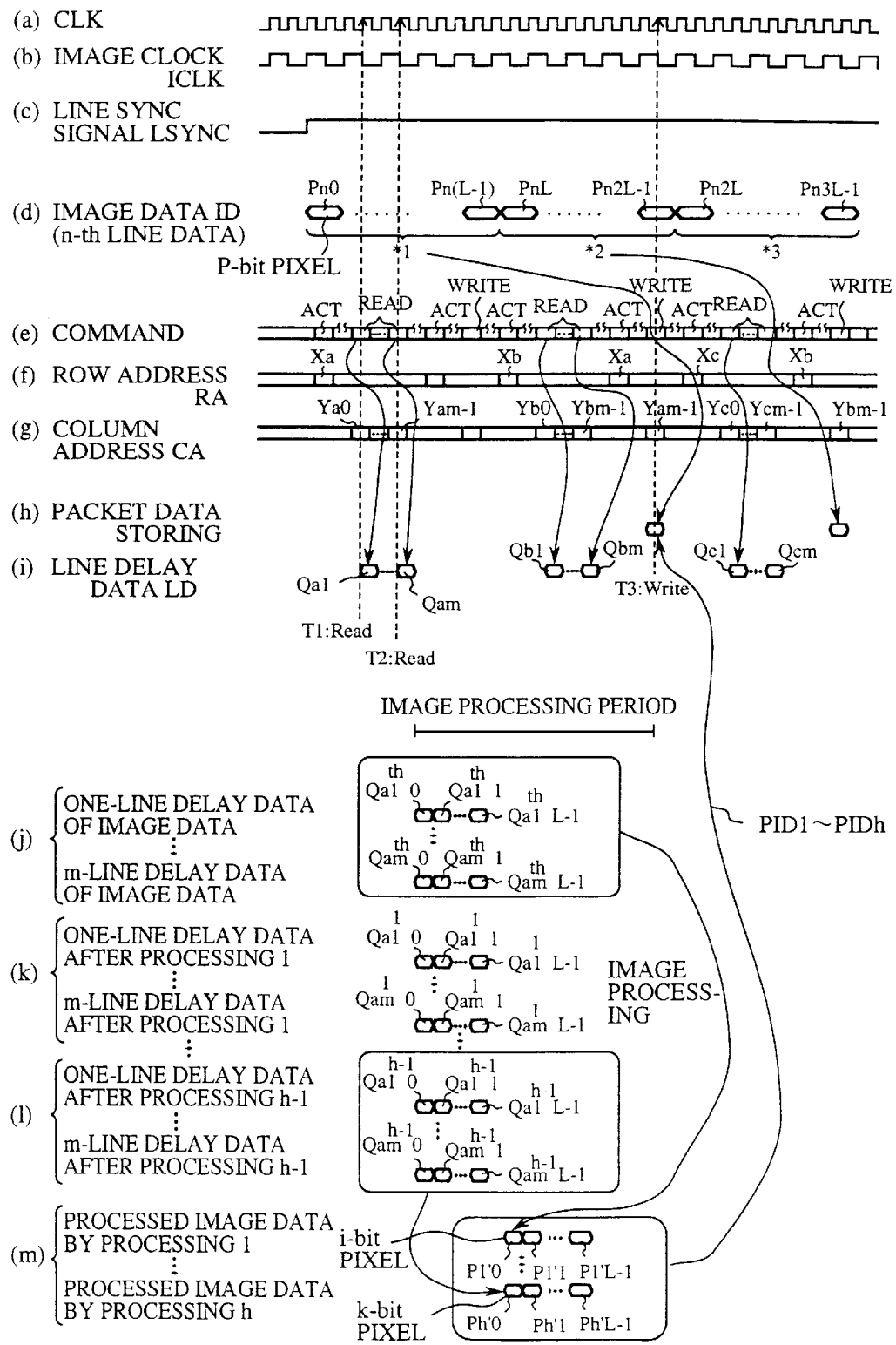
FIG. 6 is a timing chart illustrating timings of signals of the embodiment 4.

In this case, the line delay data of the processed image data can be generated as illustrated in FIG. 6 without providing such circuits as the packetizing circuit and one-port SDRAM in the post-stage of the image processing circuits 17 and 18 by supplying the packetizing circuit 14 with the processed image data PID1–PIDh which are processed by the image processing circuits 17–18 in the first to (h–1) processings, respectively.

Embodiment 5

Figure 7:
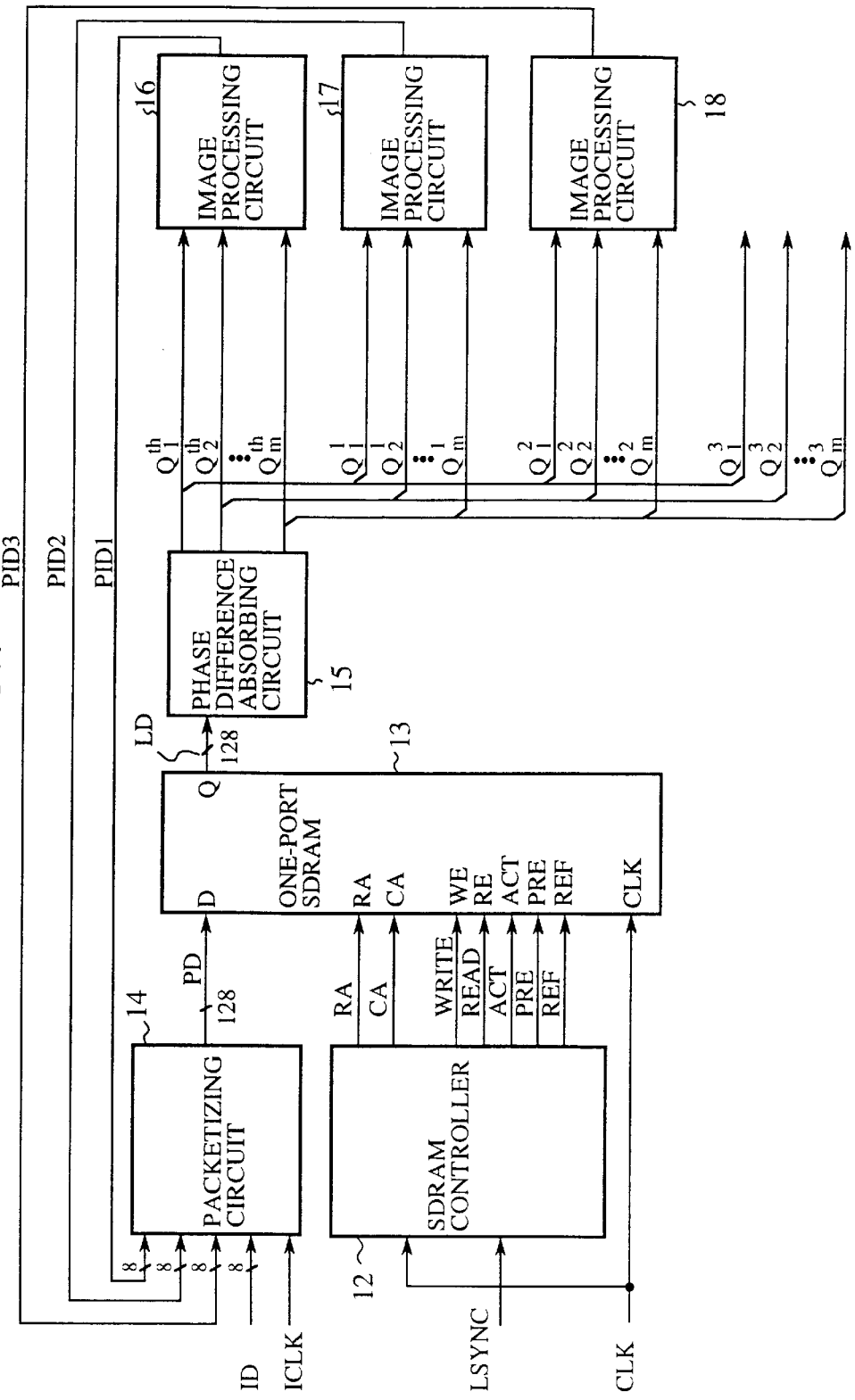
FIG. 7 is a block diagram showing an embodiment 5 of the line delay generator in accordance with the present invention.
Figure 8:
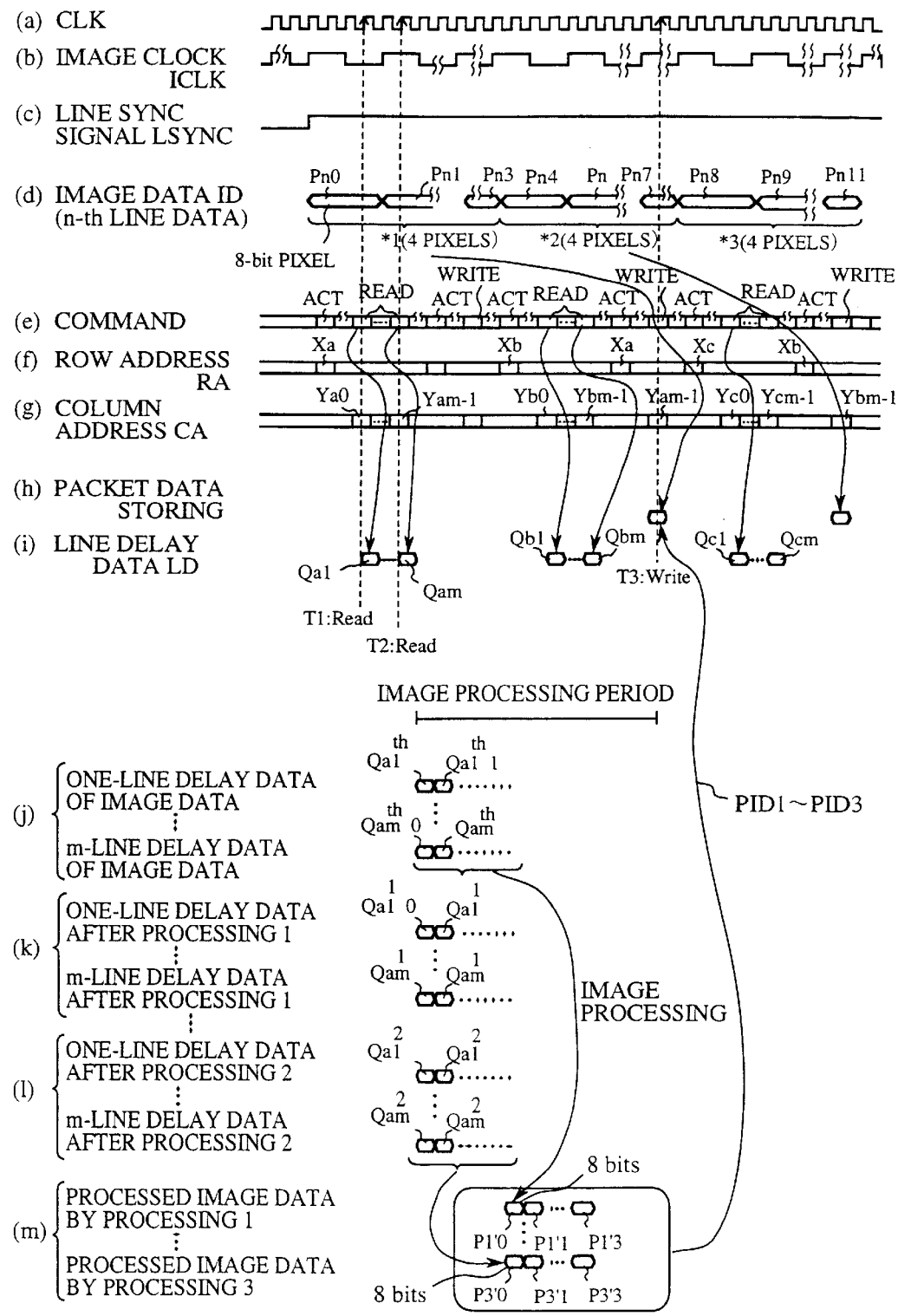
FIG. 8 is a timing chart illustrating timings of signals of the embodiment 5.
Figure 9:
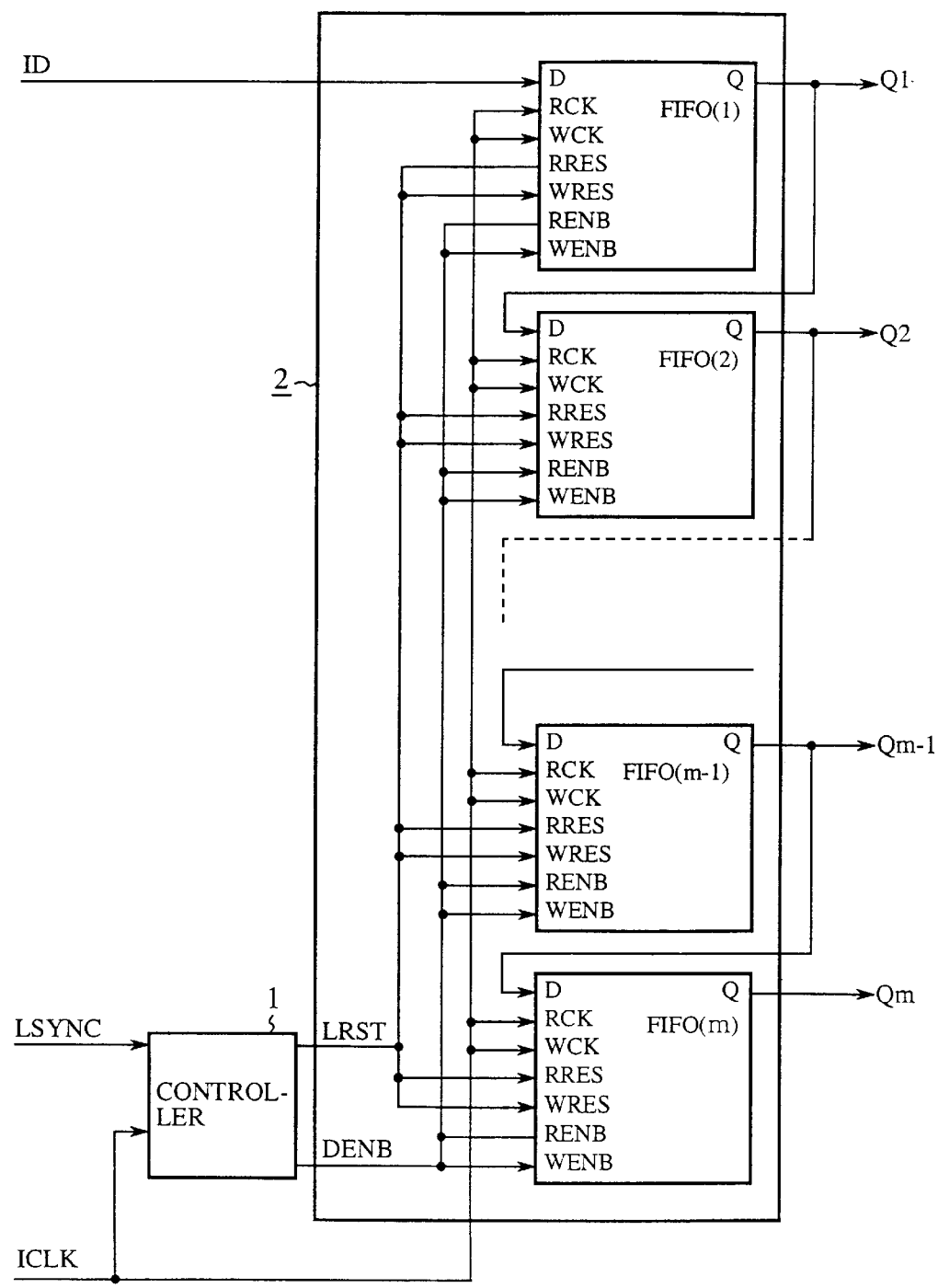
FIG. 9 is a block diagram showing a conventional line delay generator.

Although the foregoing embodiment 4 does not refer to the width of the read bus and write bus of the one-port SDRAM 13, it is possible to specify it. For example, as shown in FIGS. 7 and 8, if the packetizing circuit 14 assembles a single packet from four pixels of the image data and four pixels of each of the first to third processed image data, and each pixel consists of eight bits, the one-port SDRAM 13 must store the packet data consisting of 128 bits. Thus, if the width of the read and write buses of the one-port SDRAM 13 is set at 128 bits or more in this condition, the entire line delay data needed for the image processing can be read or write one at a time.

Embodiment 6

Although the foregoing embodiment 1 does not refer to the packetizing of the packetizing circuit 11, the one-port SDRAM 13, and the like, the packetizing circuit 11 or 14, SDRAM controller 12, one-port SDRAM 13, phase difference absorbing circuit 15 and image processing circuits 16–18 can be integrated into one chip on a semiconductor substrate.

This offers an advantage of being able to achieve high density integration and low power consumption.

Embodiment 7

Although the foregoing embodiments 1–6 employ the one-port SDRAM 13 as the one-port RAM, this is not essential. For example, a one-port SRAM, a one-port SLDRAM, a one-port RDRAM or a one-port DRAM can also be used.

What is claimed is:

1. A line delay generator comprising:
   a packetizing circuit for packetizing image data to packet data in an active period of a line synchronization signal;
   one port RAM for storing the packet data generated by said packetizing circuit; and
   a RAM controller which outputs both a write command and one or more read commands while the line synchronization signal is in an active period, said RAM controller for providing said one port RAM with a write command to write the packet data generated by said packetizing circuit, and with one or more read commands to read any packet data currently stored in said one port RAM.

2. The line delay generator as claimed in claim 1, wherein said RAM controller provides said one port RAM with the read command to read the data currently stored in said one port RAM, and subsequently with the write command to write the packet data generated by the packetizing circuit.

3. The line delay generator as claimed in claim 1, wherein said one port RAM has a read/write bus with a width of 128 or more bits.

4. The line delay generator as claimed in claim 1, wherein said packetizing circuit, said RAM controller and said one port RAM are formed in one chip on a semiconductor substrate.

5. A line delay generator comprising:
   a packetizing circuit for packetizing image data to packet data in an active period of a line synchronization signal;
   one port RAM for storing the packet data generated by said packetizing circuit;
   a RAM controller for providing said one port RAM with a write command to write the packet data generated by said packetizing circuit, and with a read command to sequentially read packet data currently stored in said one port RAM; and
   an absorbing circuit for absorbing phase shift of the packet data read from said one port RAM and for simultaneously outputting all packet data associated with the read command.

6. The line delay generator as claimed in claim 5, wherein said RAM controller provides said one port RAM with the read command to read the data currently stored in said one port RAM, and subsequently with the write command to write the packet data generated by the packetizing circuit.

7. The line delay generator as claimed in claim 5, further comprising a processing circuit for processing the packet data whose phase shift is absorbed by said absorbing circuit, to generate processed image data.

8. The line delay generator as claimed in claim 7, wherein said packetizing circuit, said RAM controller, said one port RAM, said absorbing circuit and said processing circuit are formed in one chip on a semiconductor substrate.

9. The line delay generator as claimed in claim 5, wherein said one port RAM has a read/write bus with a width of 128 or more bits.

10. The line delay generator as claimed in claim 5, wherein said packetizing circuit, said RAM controller, said one port RAM and said absorbing circuit are formed in one chip on a semiconductor substrate.

11. A line delay generator comprising:
    a packetizing circuit for packetizing image data to packet data;
    one port RAM for storing the packet data generated by said packetizing circuit;
    a RAM controller for providing said one port RAM with a write command to write the packet data generated by said packetizing circuit, and with a read command to read packet data currently stored in said one port RAM;
    an absorbing circuit for absorbing phase shift of the packet data read from said one port RAM; and
    a processing circuit for processing the packet data whose phase shift is absorbed by said absorbing circuit, to generate processed image data,
    wherein said packetizing circuit generates the packet data by packetizing the image data and the processed image data, and said absorbing circuit splits the packet data into the image data and the processed image data.

12. The line delay generator as claimed in claim 11, further comprising a reprocessing circuit for reprocessing the processed image data split apart by said absorbing circuit.

* * * * *